United States Patent [19]

Koenders et al.

[11] 4,173,616

[45] Nov. 6, 1979

[54] EXTRACTION OF COPPER VALUES FROM AQUEOUS SOLUTION

[75] Inventors: Peter Koenders; Abraham J. Van der Zeeuw; Riekert Kok, all of Amsterdam, Netherlands

[73] Assignee: Shell Oil Company, Houston, Tex.

[21] Appl. No.: 884,337

[22] Filed: Mar. 7, 1978

[51] Int. Cl.$^2$ .................. C01G 3/00; C07C 131/14
[52] U.S. Cl. .................. 423/24; 423/DIG. 14; 252/182; 260/566 A
[58] Field of Search .................. 423/24, DIG. 14

[56] References Cited

U.S. PATENT DOCUMENTS

| | | | |
|---|---|---|---|
| 3,666,446 | 5/1972 | Cook et al. | 423/DIG. 14 |
| 3,703,573 | 11/1972 | Blytas | 423/24 |

FOREIGN PATENT DOCUMENTS 1322532  7/1973  United Kingdom ............ 423/DIG. 14

OTHER PUBLICATIONS

*Chemical Abstracts,* vol. 53, (1959), Abstract No. 1976d, Peshkova et al., "Compounds of Copper, Nickel and Cobalt With a Few Dioximes."

*Primary Examiner*—Brian Hearn

[57] ABSTRACT

A process is described for the recovery of copper values from an acidic aqueous solution containing copper values by means of liquid-liquid extraction, wherein the extractant is a mixture comprising a substantially water-immiscible organic solvent, one or more hydroxyoximes capable of extracting copper values, and one or more alpha, betadioximes of the anti-configuration. Novel alpha, beta-dioxime compounds are also disclosed.

12 Claims, No Drawings

EXTRACTION OF COPPER VALUES FROM AQUEOUS SOLUTION

BACKGROUND OF THE INVENTION

This invention relates to a liquid-liquid extraction process for the recovery of copper values from aqueous solutions employing an extractant comprising one or more hydroxy-oximes and one or more alpha, beta-dioximes and to novel alpha, beta-dioxime compounds.

The ability of certain compounds having oxime groups ($>C=N-OH$) to form chelate complexes with metal values is well known. This property of oxime compounds has been exploited in processes developed for the recovery, by means of liquid-liquid extraction, of various metal values from aqueous solutions, for example those solutions which result from the leaching of ores. Such processes commonly involve the contacting of a metal value containing aqueous solution with an extractant comprising a suitable oxime ligand, generally a hydroxy-oxime compound, and an organic solvent. Through the contacting of these two essentially immiscible solutions, oxime/metal value complexes are formed which are preferentially soluble in the organic phase. Thus the extraction process involves both formation of metal value complexes and transfer of these complexes from the aqueous solution into the organic solution.

Such an extraction process is generally one step in the commercial operation for metal value recovery from ore leachate. Subsequent to the extraction of metal values from the aqueous phase into the organic phase, the phases are separated and the organic solution stripped with a strongly acidic aqueous solution to break the complexes and transfer metal values into a second aqueous solution. Finally, the metal values are recovered from this second aqueous solution as salts by crystallization or as elemental metal(s) by electrolysis. In its entirety, the operation results in the recovery of metal values in concentrated form and in the separation of desirable metal values which readily form oxime complexes, e.g. copper, from those which do not, e.g. iron.

A large number of oxime compounds have been proposed for use as extractants in such metal value recovery processes. British Pat. Nos. 1,091,354; 1,322,532; 1,421,766; and 1,440,917 all disclose the use of various hydroxy-oximes in metal value extractant compositions. Several such hydroxy-oxime based extractants are at present commercially applied for metal-value extraction. Furthermore, combinations of hydroxy-oximes and other mono-oxime compounds, generally aliphatic oximes, have been investigated, as disclosed in U.S. Pat. No. 3,428,449, South African Pat. No. 7,601,803, and British Pat. No. 1,091,354, and found to be particularly effective in such extractants.

Dioxime compounds alone are known to have utility in copper-value extraction applications, as evidenced by U.S. Pat. No. 3,703,573 and by the publication "Extraction of Cu(II), Ni(II), Co(II) and Fe(II) by Aliphatic alpha-Hydroxyiminoketones and alpha-Dioximes," A. R. Burkin and J. S. Preston, *J. Inorg. Nucl. Chem.*, Vol. 37 (1975), pp. 2187-2195.

These references subscribe to the commonly recognized theory that the hydroxy-oxime or dioxime complexes with metal values of valence two are characterized as containing two molecules of the hydroxy-oxime or the dioxime for each metal ion. For illustration, U.S. Pat. No. 3,703,573 to G. C. Blytas represents an alpha, beta-dioxime/copper complex by the structural formula:

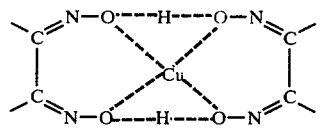

Metal value extraction processes, though apparently well defined and successfully operated, are not without problems and limitations. The economics of the process for recovering copper values from dilute ore leachate solutions using the relatively expensive hydroxy-oxime extractant compounds has heretofore restricted commercial application of the process. A principal source of inefficiency in the conventional extraction process for copper value recovery lies in the relatively slow rate of formation of the oxime/copper value chelate complexes. Accordingly, the discovery of an extractant composition capable of extracting copper values at a substantially improved rate is highly desirable.

SUMMARY OF THE INVENTION

It has now been found that extractant compositions containing a relatively minor amount of one or more of certain alpha, beta-dioxime compounds in addition to one or more hydroxy-oximes capable of copper value extraction are surprisingly effective in liquid/liquid extraction processes for the recovery of copper values from acidic aqueous solutions. The addition of alpha, beta-dioximes to hydroxy-oxime based extracts is found to significantly increase the rate of formation of hydroxy-oxime/copper complexes and thus enhance the efficiency of the extraction process. While it is recognized that both hydroxy-oximes and alpha, beta-dioximes are individually effective ligands in such copper value recovery processes, the increase in the rate of complex formation in the extraction process according to this invention in which synergistic mixtures of hydroxy-oximes and alpha, beta-dioximes are utilized in extractant compositions, over the rate of complex formation in conventional processes employing only hydroxy-oximes as the active extractant ligand is far greater that can be attributed to a mere additive contribution of the dioxime extractant. In other words, the enhancement of copper value extraction rate is accomplished by means other than the direct formation of complexes in which one or both of the organic molecules is an alpha, beta-dioxime. Furthermore, while it is also known that mixtures of certain hydroxy-oximes and certain aliphatic oximes exhibit synergistic activity in the extraction of copper values, it has been found that the same degree of synergistic enhancement of hydroxy-oximes extractant activity associated with the addition of a given quantity of the aliphatic oxime can be achieved through the addition of a much smaller quantity of alpha, beta-dioxime, as according to the process of this invention.

Another aspect of this invention concerns the discovery that it is the anti stereoisomer configuration of the alpha, beta-dioxime which is solely responsible for the synergistic nature of the extractant mixtures disclosed herein; the presence of the syn and/or the amphi configurations of alpha, beta-dioxime in hydroxy-oxime extractant mixtures does not appear beneficial for the purpose of copper value extraction.

DESCRIPTION OF THE PREFERRED EMBODIMENTS

In view of the discoveries relative to the use of the anti, syn, and amphi isomeric configurations of dioximes in the process of this invention, it is hereinafter to be understood that dioxime compounds considered as part of this invention are suitably either the isolated anti isomer or isomeric mixtures containing an effective amount of anti isomer. The alpha, beta-dioximes suitable for use in accord with this invention have the general formula I

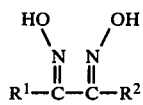

wherein $R^1$ represents an optionally substituted hydrocarbyl group and $R^2$ an optionally substituted hydrocarbyl group or a hydrogen atom. $R^1$ and $R^2$ may be joined to form an optionally substituted ring of carbon atoms. Examples of suitable hydrocarbyl groups represented by $R^1$ and $R^2$ include alkyl, cycloalkyl, aryl, alkenyl, alkapolyenyl, alkyl-substituted aryl, and aryl substituted alkyl groups. The $R^1$ and $R^2$ groups may optionally carry such substituents as, for example, alkoxy, alkylthio, aryloxy or alkoxycarbonyl groups. Suitable alpha, beta-dioximes are significantly more soluble in the organic solvent of the extractant than in water.

A class of preferred alpha, beta-dioximes is presented by general formula II

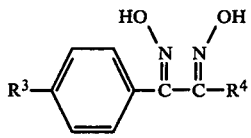

wherein $R^3$ is an alkyl group of 5 to 25 carbon atoms and $R^4$ is a hydrogen atom or an alkyl group of less than 5 carbon atoms. $R^3$ and $R^4$ groups may be branched or straight-chain and may optionally carry substituents such as, for example, alkoxy, alkylthio, or alkoxycarbonyl groups. However, $R^3$ is preferably a straight-chain alkyl group of from 10 to 18 carbon atoms and $R^4$ is preferably a hydrogen atom or a methyl group. Most preferred alpha, beta-dioximes for use in the practice of this invention are (a) mixtures of 1-(4'-alkylphenyl)-1,2-propanedione dioximes of formula II, wherein $R^3$ represents a mixture of straight-chain alkyl groups of 15 to 18 carbon atoms and $R^4$ represents a methyl group, and (b) mixtures of 2-(4'-alkylphenyl)-2-hydroxyiminoethanal oximes of formula II, wherein $R^3$ represents a mixture of straight-chain alkyl groups of 10 to 14 carbon atoms and $R^4$ is hydrogen. The alkyl groups in both mixtures (a) and (b) are bound with a tertiary carbon atom to the aromatic nucleus. It is believed that alpha, beta-dioxime compounds of formula II are novel materials.

Compounds of the general formula III are likewise suitable alpha, beta-dioximes for use in this invention:

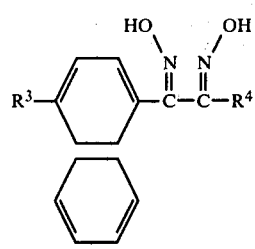

wherein $R^3$ and $R^4$ are defined for general formula II above. A preferred compound of formula III is 1-(4'-dodecylnaphthyl)-1,2-propanedione dioxime. Preparation of alpha, beta-dioxime compounds of formula III can be accomplished by conventional techniques, as illustrated in Example 5 below. It is believed that alpha, beta-dioximes of formula III are novel materials.

Other preferred alpha, beta-dioximes are those represented by general formula I wherein $R^1$ and $R^2$ are branched or straight-chain alkyl groups which may optionally be joined together to form an optionally substituted ring of carbon atoms. One group of such preferred compounds are the alpha, beta-alkanedione dioximes having 10 to 25 carbon atoms per molecule. Very good results have been obtained with the symmetrical 8,9-hexanedione dioxime. Preparation of alpha, beta-alkanedione dioximes is illustrated by the previously cited work of Burkin and Preston, incorporated hereon by reference. Another group of such preferred compounds are the alkyl-1,2-cyclohexanedione dioximes. Preferred among these cyclic dioximes are the 4-alkyl-1,2-cyclohexanedione dioximes wherein $R^3$ may be straight or branched and has from 5 to 25 carbon atoms. Very good results have been obtained with a mixture of 4-nonyl-1,2-cyclohexanedione dioximes. Preparation of alkyl-1,2-cyclohexanedione dioximes is illustrated in U.S. Pat. No. 3,703,573 to Blytas, which is incorporated herein by reference. The preparation of the particular 4-nonyl-1,2-cyclohexanedione mixture employed herein involved intermediate steps for the alkylation of benzene with propylene trimer, thereby resulting in a mixture of branched nonyl groups.

The common procedures for preparation of alpha, beta-dioximes result in a mixture of the anti and the syn configurations, and, in the case of a symmetrical alpha, beta-dioximes, the amphi configuration or, in the case of asymmetrical alpha, beta-dioximes, the two amphi configurations. Definition of these configurations is in accordance with *Methoden der Organischen Chemie*, Houben-Weyl, Vol. X/4 (1968), p. 285. While it has been found that only the anti configuration is responsible for synergistic extraction activity in combination with hydroxy-oximes, the presence of the syn and amphi forms in the copper value extractant compositions employed in the process of this invention does not appear to have adverse influence upon the process. Accordingly, the alpha, beta-dioximes may be used in extractant mixtures as prepared, i.e. as a mixture of the anti, the syn, and the amphi forms, or, as is preferred, the anti configuration may be isolated from the other forms prior to use. Methods for isolation of the anti configuration are generally known and are illustrated by Examples 2 and 4 below.

The hydroxy-oximes suitable for use in the extractant compositions of this invention have the general formula IV

(IV)

wherein $R^5$ represents an optionally substituted hydrocarbyl group or a hydrogen atom and A an aromatic group carrying as substituent a hydroxyl group at a ring carbon atom which is in a 2-position (the number-1 position being assigned to the ring carbon atom to which the —C(=NOH)—$R^5$ group is attached) and also optionally carrying an organic group $R^6$ as an additional substituent at the -3, -4, -5, or -6 ring position. Suitable hydroxy-oximes must be significantly more soluble in the organic solvent of the extractant than in water.

The aromatic group A in the general formula IV may be carbocyclic or heterocyclic. Examples of suitable A groups are phenyl, naphthyl, furyl and pyridyl groups. Preference is given to a phenyl group.

The organic group $R^6$ which may be attached to the aromatic group A in the general formula IV may be, for example, an alkyl, cycloalkyl, aryl, alkenyl or alkapolyenyl group. These groups may carry hydrocarbyl substituents, as is the case in, for example, alkyl-substituted aryl groups and aryl-substituted alkyl groups. $R^6$ may optionally carry substituents, for example, alkyloxy, alkylthio, aryloxy or alkoxycarbonyl groups. Preference for the $R^6$ substituent is given to the alkyl group. This alkyl group may be straight or branched and preferably has a number of carbon atoms in the range from 7 to 25 and particularly from 7 to 14. Examples of suitable alkyl groups are heptyl, octyl, nonyl, decyl, undecyl, dodecyl, tridecyl, and tetradecyl groups and their isomers. Very suitable for use in the process of this invention are mixtures of hydroxy-oximes of the general formula IV in which the alkyl group $R^6$ attached to the phenyl group A represents a mixture of branched nonyl groups derived from alkylation of phenol with propylene trimer. The alkyl group may be bound to a ring carbon atom which is in a 3-, 4- or 6-position, but is preferably bound at the 5-position. The aromatic group A may also carry primary amino, secondary amino and tertiary amino groups and inorganic substituents, for example, chlorine atoms and nitro groups.

The optionally substituted hydrocarbyl group $R^5$ in the general formula IV may, for example, represent an alkyl, cycloalkyl, aryl, alkenyl or alkapolyenyl group. These groups may carry hydrocarbyl substituents, as is the case in, for example, alkyl-substituted aryl groups and aryl-substituted alkyl groups. Preference is given to alkyl and aromatic groups. The alkyl group may be straight or branched and may have, for example, from one to twenty carbon atoms. Examples of suitable alkyl groups are: methyl, ethyl, pentyl, heptyl, octyl, nonyl, undecyl, tridecyl and heptadecyl groups and isomers thereof. Methyl groups are preferred, because they generally allow the highest extraction and stripping rates. Among the aromatic groups suitably represented by $R^5$, phenyl groups are peferred.

Particularly preferred hydroxy-oximes of the general formula IV are mixtures of 2'-hydroxy-5'-nonylacetophenone oximes, mixtures of 2-hydroxy-5-nonylbenzophenone oximes, and mixtures of benzyl 2-hydroxy-5-nonylphenyl ketone oximes, in which three mixtures the nonyl groups are a mixture of branched nonyl groups derived through the alkylation of phenol with propylene trimer.

Examples of hydroxy-oximes of the general formula IV in which $R^5$ represents a hydrogen atom are 5-tert-butyl-2-hydroxybenzaldoxime, 5-dodecyl-2-hydroxybenzaldoxime, 3,5-di-tert-butyl-2-hydroxybenzaldoxime, 2-hydroxy-5-octylbenzaldoxime, 2-hydroxy-3,5-di-tert-pentylbenzaldoxime, 2-hydroxy-5-tert-nonylbenzaldoxime and 2-hydroxy-3,5-di(1-methylbutyl)benzaldoxime.

Numerous hydroxy-oxime compounds are known as suitable ligands in extraction processes for recovery of metal values, according to the teachings of references cited above, i.e. British Pat. Nos. 1,091,354; 1,322,532; 1,421,766 and 1,440,917. These references also disclose the general methods of preparation of hydroxy-oximes of formula IV and are incorporated herein by reference for such teachings.

The extractants suitable for use in the copper value recovery process of this invention comprise one or more of the alpha, beta-dioxime compounds of formula I, one or more of the hydroxy-oxime compounds of formula IV, and an essentially water-immiscible organic solvent. Suitable organic solvents must possess appreciable solubility for the alpha, beta-dioximes, the hydroxy-oximes, and the hydroxy-oxime/copper complexes, but should have mutual miscibility, at process temperature, with the acidic aqueous copper value-containing solution of less than 5 percent by volume (%v), preferably of less than 1%v. Halogenated organic solvents, for example chloroform, 1,2-dichloroethane, 1,2-dichloropropane, and di(2-chloroethyl) ether have been found suitable; however, the hydrocarbons, such as kerosine, toluene and the xylenes, are preferred as extractant solvents. Many of the solvents employed in conventional processes using hydroxy-oxime ligands may be generally expected to perform suitably in the process of this invention.

The concentration of hydroxy-oxime(s) in the extractant is not critical to the operation of this invention and may fall in the range of concentrations conventionally known to be suitable for metal value extraction processes involving such oximes, i.e. generally 2 percent by mole (%m) to 50% m. It is preferable to start the extraction process with an extractant containing an excess of hydroxy-oxime over that stoichiometrically required to complex the available copper values in the aqueous solution, i.e. in the ratio of 2 moles of the hydroxy-oxime to one mole of the copper values.

Likewise, the concentration of alpha, beta-dioxime in the extractant is not critical. The concentration of alpha, beta dioxime—expressed as %m, based on moles of hydroxy-oxime—which will result in most efficient utilization of the alpha, beta-dioxime for production of synergistic increase in extraction yield can be readily established by a means of simple extraction experiments. In successive experiments, the concentration of dioxime in the extractant is increased and the relationship between extraction time and extraction yield is noted. The optimal concentration of dioxime in the extractant has been reached when further addition of dioxime does not result in appreciable decrease in extraction time for a given yield, or alternatively, in appreciable increase in extraction yield at a given time. This optimal percentage is usually in the range of from 0.1 to 10% m, calculated on hydroxy-oxime, and preferably is between 0.1 and 5% m. An alpha, beta-dioxime concentration of 0.2 to 1%m will generally be sufficient for obtaining a suitably high extraction yield after a short time, and a concentration within this range is most preferred. While the use of quantities of alph, beta-dioxime greater than 10%m is generally unnecessary, such excessive quantities are not found to detract from the improvements in extractant activity afforded by lesser quantities.

The copper value extraction process according to this invention is suitably carried out in an extraction equipment which provides sufficient contact between the organic extractant solution and the aqueous solution containing copper values. Contactors and other equipment developed heretofore for use in metal value extraction processes employing hydroxy-oxime extractants are particularly suitable. A multistage continuous counter-current extraction is preferable, although the process of this invention may be operated in a batch mode or with a single contact stage. Agitation of the two phase mixture is required in each extraction stage.

The organic extractant and the acidic aqueous copper value-containing solution are contacted in roughly equal quantities, generally in volume ratios between 1:3 and 3:1. However, ratios outside this range may prove useful, as when, for instance, the concentration of the hydroxy-oxime in the extractant or the concentration of the copper values in the aqueous solution is unusually high or low. As a rule, the extraction process of this invention proceeds smoothly at temperatures between 15° C. and 35° C. However, temperatures in a wider range, for example 0°–75° C., are not precluded. Aqueous solutions from which copper values are extracted may suitably contain metal values other than copper. For example, the extraction process according to this invention is particularly suitable for the separation of copper values from ore leachate solutions also containing iron values, which in the course of the extraction do not form complexes with the ligand and remain in the aqueous solution. This invention is preferably carried out upon aqueous copper value-containing solutions having a pH between 0 and 3.

The invention is further illustrated by reference to the Examples. The quantitative results of single-stage batch copper value extraction experiments are therein expressed in terms of "extraction yield," which is calculated according to the following methods. After the aqueous solution containing copper values has been contacted under agitation with the organic extractant solution for a period of "t" minutes (0.5 or 1.0 minute in these examples), a sample is drawn while agitation is continued. This sample is allowed to separate, by settling into discrete aqueous and organic phases, and the copper content of the organic phase—indicated in terms of "a" milligrams copper per liter—is determined. When, after prolonged stirring of the aqueous solution and the organic extractant mixture, equilibrium has been reached with respect to copper value complex formation, the mixture is separated into an aqueous phase and an organic phase, and the copper content of the organic layer—indicated as "b" milligrams copper per liter—is determined. The extraction yield after t minutes, expressed as a percentage, is defined as $(a/b) \times 100$.

EXAMPLE 1

A mixture of the alpha, beta-dioxime compounds, 2-(4'-alkylphenyl)-2-hydroxyiminoethanal oximes, corresponding to general formula II, wherein $R^3$ represents a mixture of straight-chain alkyl groups having from 10 to 14 carbon atoms and $R^4$ represents a hydrogen atom, was prepared via the following three steps.

(1) Preparation of a mixture of 4' alkylacetophenones having a mixture of straight alkyl groups with 10 to 14 carbon atoms. A mixture of 1 mol of "Dobane JN", 200 ml of tetrachloroethylene, and 1 mol of powdered aluminum trichloride was cooled to −10° C. (Mixtures of alkylbenzenes obtained by alkylating benzene with mixtures of n-alkenes having 10–14 carbon atoms per molecule, said mixture being derived from the thermal cracking of petroleum wax, are commonly known under the trademark "Dobane JN".) Then 1.05 mole of acetyl chloride was added dropwise to the mixture with vigorous stirring, the temperature being kept below 0° C. After completion of the acetyl chloride addition, the mixture was poured into 300 ml of 2 N aqueous hydrochloric acid, the mixture thus formed was separated into an aqueous and an organic phase, the aqueous phase was extracted with two 100 ml portions of n-hexane, the combined extract phases were washed with two 100 ml portions of water, with 200 ml of a 0.5 M aqueous solution of sodium carbonate and with 200 ml of water, the washed organic phase was dried over anhydrous sodium sulphate and the dried organic phase was distilled at sub-atmospheric pressure to leave a very pale yellow residue. This residue consisted of the desired mixture of acetophenones, which was obtained in quantitative yield.

(2) Preparation of a mixture of 2-(4'-alkylphenyl)-2-oxoethanal oximes having a mixture of straight alkyl groups with 10 to 14 carbon atoms. A solution of 0.1 mol of the mixture of alkylacetophenones prepared in step (1) in 100 ml of diethyl ether was saturated with gaseous hydrogen chloride of atmospheric pressure at a temperature between 0° and 10° C. Then 0.1 mol of isopropyl nitrite was added dropwise to the solution with stirring over a period of half an hour. After this addition, stirring was continued for two hours at a temperature between 0° and 10° C. The reaction mixture thus formed was washed with two 25 ml portions of water, the diethyl ether was evaporated from the washed mixture, and the residue thus obtained was poured into 150 ml of a 5 percent by weight (%w) solution of sodium hydroxide in a mixture consisting of 50% v of water and 50% v of ethanol. The solution thus obtained was extracted with two 50 ml portions of n-pentane to remove any unconverted 4'—$C_{10}$—$C_{14}$-alkylacetophenone. An amount of 2N aqueous sulphuric acid sufficient to decrease the pH of the extracted aqueous solution to a value of 2 was added and then the mixture was extracted with two 100 ml portions of diethyl ether. The ethereal phase was dried over anhydrous sodium sulphate and the dried ethereal phase was distilled to leave a residue having a content of the mixture of the desired 2-oxoethanal oximes of more than 95%. The yield of these oximes was 85%, calculated on the starting amount of 4'-alkylacetophenones.

(3) Preparation of a mixture of 2-(4'-alkylphenyl)-2-hydroxyimonoethanal oximes having a mixture of straight alkyl groups with 10 to 14 carbon atoms. A flask was provided with 0.1 mol of the mixture of 2-oxoethanal oximes present in the residue prepared in step (2), 0.05 of hydroxylamine sulphate, 0.1 mol of sodium acetate 3H$_2$O and 100 ml of a mixture of 96% v ethanol and 4% v water. Then the mixture in the flask was heated under reflux for a period of four hours. After this period ethanol was distilled off at sub-atmospheric pressure, the residue formed was mixed with 100 ml of water and 100 ml of diethyl ether, the mixture was allowed to separate into an aqueous and an ethereal layer, the ethereal layer was isolated and the acetic acid was removed by washing with two 50 ml portions of water, the acid-free ethereal solution was dried over sodium sulphate and the dried ethereal solution was distilled at sub-atmospheric pressure to leave a residue consisting of the mixture of 2-hydroxyiminoethanal oximes, which was obtained in quantitative yield. Analysis by means of high-pressure liquid chromatography showed that these dioximes consisted of a mixture of their syn, anti and amphi forms.

EXAMPLE 2

The mixture of 2-(4'-alkylphenyl)-2-hydroxyiminoethanal oximes prepared according to Example 1 was treated to isolate the anti configuration of the dioximes via the following procedure. An amount of 0.1 mol of the mixture of dioximes prepared in step (3) of Example 1 was stirred for 30 minutes with 200 ml of n-heptane at a temperature of 50° C. At the end of this period a suspension was present which was separated by filtration into solid material and a solution in n-heptane. The solid material was an almost pure mixture of the desired anti 2-hydroxyiminoethanal oximes, obtained in a yield of 60%, calculated on the starting amount of dioximes.

EXAMPLE 3

A mixture of 1-(4'-alkylphenyl)-1,2-propanedione dioximes, corresponding to formula II, wherein $R^3$ represents a mixture of straight-chain alkyl groups of 15 to 18 carbon atoms and $R^4$ is a methyl group, was prepared according to the general procedures of Example 1. However, the "Dobane JN" reactant of Example 1 was here replaced by a mixture of monoalkylbenzenes having straight alkyl groups with 15 to 18 carbon atoms and the acetyl chloride reactant was replaced by propanoyl chloride. The mixture of monoalkylbenzenes has been prepared by alkylating benzene with a mixture of n-alkanes having 15 to 18 carbon atoms per molecule obtained by thermal cracking of petroleum wax comprising a mixture of n-alkanes. Yield of the 1-(4'-alkylphenyl)-1,2-propanedione dioximes following completion of the 3-step procedure was 85%, calculated on the starting amount of monoalkylbenzenes.

EXAMPLE 4

A mixture of anti 1-(4'-alkylphenyl)-1,2-propanedione dioximes, having straight-chain alkyl groups of 15 to 18 carbon atoms, was isolated from the dioxime mixture produced according to Example 3 via the same general procedure employed in Example 2. Quantitative results obtained with respect to isolation of the anti configuration of the dioxime were substantially identical to those disclosed in Example 2.

EXAMPLE 5

A method for preparation of 1-(4'-dodecylnaphthyl)-1,2-propanedione dioxime, substantially in the anti configuration, is described as follows.

1-n-Dodecylnaphthylene was converted into ethyl 4-dodecyl-1-naphthyl ketone in the manner described in step (1) of Example 1, with the difference that "DOBANE JN" was replaced by 1-n-dodecylnaphthalene and acetyl chloride by propanoyl chloride. The yield of ethyl 4-dodecyl-1-naphthyl ketone was 95%, calculated on starting 1-dodecylnaphthalene. Ethyl 4-dodecyl-1-naphthyl ketone was converted into 1-(4'-dodecylnaphthyl)-1-oxo-2-propanone oxime in the manner described in step (2) of Example 1. The yield of the latter compound was 82%, calculated on starting ethyl 4-dodecyl-1-naphthyl ketone.

A flash was provided with 1-(4'-dodecylnaphthyl)-1-oxo-2-propanone oxime (0.02 mole), hydroxylamine hydrochloride (0.02 mole), pyridine (0.03 mole) and 2-propanol (50 ml). Then the mixture in the flask was heated under reflux for a period of three hours. After this period 2-propanol was distilled off at sub-atmospheric pressure, the residue formed was mixed with water (20 ml) and diethyl ether (20 ml), the mixture was allowed to separate into an aqueous and an ethereal layer, the ethereal layer was isolated and remaining pyridine was removed from it by washing with two 10 ml portions of water, the washed ethereal solution was dried over sodium sulphate and the dried ethereal solution was distilled at sub-atmospheric pressure to leave a residue consisting of 1-(4'-dodecylnaphthyl)-1,2-propanedione dioxime, which was obtained in quantitative yield. Analysis by means of high-pressure liquid chromatography showed that the latter compound contained 80% of the anti isomer.

EXAMPLES 6–17

The copper value extraction experiments of these Examples were carried out in a box characterized by a length and width of 6.4 cm and a height of 8.9 cm. The box was provided with a stirrer having a disc-shaped impeller with a diameter of 3 cm, with a thickness of 0.6 cm, and with six equi-spaced axial grooves, 0.3 cm wide and deep, on the bottom of the disc.

The starting aqueous solution contained cupric sulphate and ferric sulphate sufficient to produce concentrations of 4.0 g of copper values and 4.0 g of iron values per liter, and sufficient free sulphuric acid to give a pH of 1.90.

The starting extractant solution consisted of an organic solvent and a mixture of dissolved 2-hydroxyphenyl oximes, or these in combination with ether an alpha, beta-dioxime or a mixture of alpha, beta-dioximes. The organic solvent was a kerosine fraction having an atmospheric boiling range from 193° C. to 245° C. and containing 20% w aromatic hydrocarbons. The employed mixtures of 2-hydroxyphenyl oximes and their trademarks are listed in Table 1.

TABLE 1

| Nomenclature | Trademark |
|---|---|
| 2'-hydroxy-5'-nonylacetophenone oximes | SME 529 |
| 2-hydroxy-5-nonylbenzophenone oximes | LIX 65 N |
| benzyl 2-hydroxy-5-nonylphenyl ketone oximes | ACORGA P-17 |

The nonyl groups in these three mixtures of hydroxy-oximes are a mixture of branched nonyl groups derived from the alkylation of phenol with propylene trimer. Each of the three mixture of hydroxy-oximes was used individually in various examples at a concentration of 0.1 mol/liter of kerosine. The alpha, beta-dioximes utilized in the extractant compositions tested in the examples are listed by name and given a convenient letter designation in Table 2. Table 2 also includes two oximes, designated by the Roman numerals I and II, which are known to give synergistic extractant activity for copper when combined with the hydroxyoximes of Table 1. Oxime II is known under the trade name "LIX 63".

TABLE 2

| Name of the alpha, beta-dioxime | Designation |
|---|---|
| 8,9-hexadecanedione dioxime | A |
| mixture of 2-(4'-$C_{10-14}$-alkyl-phenyl)-2-hydroxy-iminoethanal oximes | B |
| mixture of 1-(4'-$C_{15-18}$-alkyl-phenyl)-1,2-propanedione dioximes | C |
| mixture of 4-nonyl[1]-1,2-cyclohexanedione dioximes | D |
| Name of the oxime | Designation |
| mixture of 2-(4'-$C_{10-14}$-alkyl-phenyl) hydroxymethyl ketone oximes | I |
| 5,8-diethyl-6-hydroxy-7-dodecanone oxime | II |

Notes:
[1] a mixture of branched nonyl groups derived from alkylation of phenol with propylene trimer.
[2] The mixture of $C_{10-14}$ alkyl groups has the same composition as in dioxime B.

100 ml of the starting aqueous extraction feedstock solution was introduced into the square box and then 100 ml of the starting organic extractant solution was carefully poured on top of the aqueous solution. Temperature throughout the mixture was 23° C. The impeller was positioned such that half of it was in the organic layer and the other half in the aqueous layer, with the axis in the middle of the cross section of the box.

Stirring was started at a speed of 2000 rev/min. After 0.5 and after 1 minute of stirring, a sample was drawn from the mixture while stirring was continued. These samples were each allowed to separate into organic and aqueous layers. Copper content of the organic layer was then determined. After 20 minutes of stirring, the aqueous solution and the extractant solution were essentially in equilibrium with respect to copper value concentrations. Stirring was stopped and the two phases were allowed to separate. Equilibrium copper content of the organic phase was determined, and extraction yield calculated.

Table 3 presents the parameters and the results of Examples 6-17. In each of these Examples are hydroxy-oxime in the extractant was SME 529. The dioximes employed were used as prepared, i.e. containing anti, syn, and amphi forms, unless indicated otherwise. Comparative performance of hydroxy-oxime/oxime extractant compositions known to exhibit synergism is provided by Examples 15-17. Example 6, in which no alpha, beta-dioxime was present in the extractant, and Examples 15-17 provide comparative results and are not carried out according to this invention.

TABLE 3

| | Dioxime or *Oxime | | | Extraction yield %, after | |
|---|---|---|---|---|---|
| Ex. No. | designation | prepared according to Examples | %m, calculated on SME 529 | 0.5 min. | 1 min. |
| 6 | — | — | 0.0 | 43 | 65 |
| 7 | A | — | 0.5 | 62 | 79 |
| 8 | A | — | 2.0 | 85 | 95 |
| 9 | B(anti) | 1,2 | 0.5 | 84 | 94 |
| 10 | C(anti) | 3,4 | 0.1 | 65 | 80 |
| 11 | C(anti) | 3,4 | 0.5 | 84 | 94 |
| 12 | C(anti) | 3,4 | 1.0 | 86 | 97 |
| 13 | D | — | 0.5 | 54 | 71 |
| 14 | D | — | 2.0 | 66 | 82 |
| 15 | I* | — | 10.0 | 88 | 97 |
| 16 | II* | — | 5.0 | 67 | 82 |
| 17 | II* | — | 10.0 | 84 | 94 |

EXAMPLE 18-22

The extraction experiments of Examples 18-22 were carried out using the hydroxy-oxime mixtures known as LIX 65 N and ACORGA P-17 in place of SME 529 as the principal ligand of the extractant compositions. The anti form of dioxime B was used in Examples 19, 20 and 22; no dioxime was added to the extractant for Examples 18 and 21. Table 4 presents results of these experiments, along with results of Examples 6 and 9 for comparison.

TABLE 4

| Ex. No. | Mixture of hydroxy-oximes | %m of dioxime B(anti), calculated on hydroxy-oximes | Extraction yield, %, after | |
|---|---|---|---|---|
| | | | 0.5 min. | 1 min. |
| 6 | SME 529 | 0.0 | 43 | 65 |
| 9 | SME 529 | 0.5 | 84 | 94 |
| 18 | LIX 65 N | 0.0 | 52 | 72 |
| 19 | LIX 65 N | 0.1 | 75 | 89 |
| 20 | LIX 65 N | 0.5 | — | 100 |
| 21 | ACORGA P-17 | 0.0 | 51 | 69 |
| 22 | ACORGA P-17 | 0.5 | 84 | 94 |

EXAMPLES 23-28

The experiments of Examples 23-28 were carried out using an extractant comprising SME 529 hydroxy-oxime and the alpha, beta-dioxime designated C. The general extraction procedures of Examples 6-17 were again followed.

Three grades of dioxime C were employed in the extractant compositions of Examples 23-28, each grade consisting of different relative proportions of the anti, syn, and amphi configurations, as illustrated in Table 5.

TABLE 5

| Dioxime C, grade | Composition, %m, | |
|---|---|---|
| | anti | syn plus amphi |
| a | 92 | 8 |
| b | 35 | 65 |
| c | 17 | 83 |

Table 6 presents the results of the extraction experiments of Examples 23-28 and comparative data for Example 6. It is shown that copper value extraction performance can be correlated with concentration of the anti configuration of the alpha, beta-dioxime in the extractant, but not with concentration of the syn and amphi configurations.

TABLE 6

| Ex. No. | Grade of dioxime C present | %m of all configurations of dioxime C, calculated on SME 529 | %m of anti configuraton, calculated on SME 529 | Extraction yield, %, after | |
|---|---|---|---|---|---|
| | | | | 0.5 min. | 1 min. |
| 6 | — | 0.0 | 0.0 | 43 | 65 |
| 23 | a | 0.1 | 0.09 | 65 | 80 |
| 24 | b | 0.25 | 0.09 | 60 | 77 |
| 25 | c | 0.56 | 0.095 | 64 | 79 |
| 26 | a | 0.50 | 0.46 | 84 | 94 |
| 27 | b | 1.3 | 0.46 | 85 | 95 |
| 28 | c | 2.9 | 0.49 | 86 | 97 |

We claim as our invention:
1. A process for the separation, by liquid/liquid extraction, of copper values from an acidic aqueous solution containing copper values, which comprises contacting the acidic aqueous solution with an organic extractant comprising (a) a substantially water-immiscible organic solvent, (b) a hydroxy-oxime or a mixture of hydroxy-oximes capable of extracting copper values, and (c) between 0.1 and 10% by mole, calculated on hydroxy-oxime, of an alpha, beta-dioxime in the antistereoisomer configuration or a mixture of alpha, beta-dioximes each in the antistereoisomer configuration, said alpha, beta-dioxime or alpha, beta dioximes having the general formula

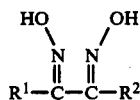

wherein $R^1$ represents an optionally substituted hydrocarbyl group and $R^2$ and optionally substituted hydrocarbyl group or a hydrogen atom and wherein $R^1$ and $R^2$ may be optionally joined to form an optionally substituted ring of carbon atoms.

2. The process of claim 1 in which the hydroxy-oxime or each of the mixture of hydroxy-oximes is of the general formula

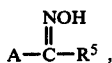

wherein $R^5$ represents an optionally substituted hydrocarbyl group or a hydrogen atom and A represents an aromatic group carrying as a substituent a hydroxyl group at a ring carbon atom which is in a 2-position, the number-1 position being assigned to the ring carbon atom to which the $-C(NOH)-R^5$ group is attached, and also optionally carrying an organic group $R^6$ as an additional substituent at the -3, -4, -5, or -6 ring position.

3. The process of claim 2 in which the alpha, beta-dioxime or each of the mixture of alpha, beta-dioximes is of the general formula

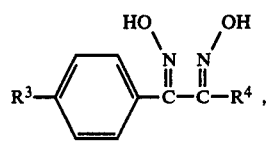

wherein $R_3$ is an alkyl group of from 5 to 25 carbon atoms and $R^4$ is a hydrogen atom or an alkyl group of less than 5 carbon atoms.

4. The process of claim 3 in which $R^4$ represents a methyl group or a hydrogen atom.

5. The process of claim 4 in which $R^3$ represents a mixture of straight-chain alkyl groups having between 10 and 18 carbon atoms.

6. The process of claim 2 in which the alpha, beta-dioxime or each of the mixture of alpha, beta-dioximes is an alkyl-1,2-cyclohexanedione dioxime.

7. The process of claim 6 in which the alkyl-1,2-cyclohexanedione dioxime is a 4-alkyl-1,2-cyclohexanedione dioxime.

8. The process of claim 7 in which the alkyl group in the alkyl-1,2-cyclohexanedione dioxime has from 5 to 25 carbon atoms.

9. The process of claim 8 in which the alkyl group is a branched nonyl group.

10. The process of claim 2 in which the alpha, beta-dioxime or each of the mixture of alpha, beta-dioximes is an alpha, beta-alkanedione dioxime.

11. The process of claim 10 in which the alpha, beta-alkanedione dioxime has from 10 to 25 carbon atoms per molecule.

12. The process of claim 11 in which the alpha, beta-alkanedione dioxime is 8,9-hexadecanedione dioxime.

* * * * *